United States Patent
Mi et al.

(10) Patent No.: US 11,744,242 B2
(45) Date of Patent: Sep. 5, 2023

(54) LIVING BODY SPECIMEN TRANSPORT DEVICE

(71) Applicant: SCL Biotech Ltd., Apia (WS)

(72) Inventors: Hsin-Wu Mi, New Taipei (TW); Ming-Cheng Lee, New Taipei (TW); Jen-Sheng Hsu, New Taipei (TW)

(73) Assignee: DRSIGNAL BIOTECHNOLOGY CO., LTD., Taipei (TW)

( * ) Notice: Subject to any disclaimer, the term of this patent is extended or adjusted under 35 U.S.C. 154(b) by 461 days.

(21) Appl. No.: 17/023,365

(22) Filed: Sep. 17, 2020

(65) Prior Publication Data
US 2022/0079141 A1    Mar. 17, 2022

(51) Int. Cl.
*A01N 1/02* (2006.01)
*G01S 19/14* (2010.01)

(52) U.S. Cl.
CPC ............ *A01N 1/0257* (2013.01); *G01S 19/14* (2013.01)

(58) Field of Classification Search
CPC .............................. A01N 1/0257; G01S 19/14
See application file for complete search history.

(56) References Cited

U.S. PATENT DOCUMENTS

| 4,997,090 | A | 3/1991 | Lenmark, Sr. et al. |
| 8,368,035 | B2 * | 2/2013 | Seibel ................ G01N 15/1436 250/461.2 |
| 9,536,122 | B2 * | 1/2017 | Potyrailo ................ H04Q 9/00 |
| 2016/0135448 | A1 * | 5/2016 | Nevo ................ A61B 10/0096 435/307.1 |
| 2019/0293344 | A1 * | 9/2019 | Sun ...................... A01N 1/0257 |

FOREIGN PATENT DOCUMENTS

| CN | 101479042 U | 7/2009 |
| CN | 101918138 A | 12/2010 |
| CN | 202794149 U | 3/2013 |
| CN | 205879652 U | 1/2017 |
| CN | 107132361 A | 9/2017 |

(Continued)

OTHER PUBLICATIONS

WO2016120224A1 Machine English Translation (Year: 2016).*
WO2016170086A1 Machine English Translation (Year: 2016).*

*Primary Examiner* — Michael L Hobbs
*Assistant Examiner* — Lenora A Abel
(74) *Attorney, Agent, or Firm* — Bradley J. Thorson; DeWitt LLP (57) ABSTRACT

A living body specimen transport device for receiving multiple living body specimens has a frame, a rotating bracket, and a storage assembly. The rotating bracket can be rotated with respect to the frame. The storage assembly can receive a container with a living body specimen and be rotated with respect to the rotating bracket. A center of gravity of the storage assembly is lower than a pivoting point where the rotating bracket is mounted on the frame and a pivoting point where the storage assembly is mounted on the rotating bracket. With such structure, even when the living body specimen transport device is vibrated and shaken during transporting and then the frame of the living body specimen transport device is tilted or turned over, the rotating bracket and the storage assembly can rotate to be vertical by themselves, which keeps the living body specimen being soaked in the preservation solution.

11 Claims, 6 Drawing Sheets

(56) References Cited

FOREIGN PATENT DOCUMENTS

| | | | |
|---|---|---|---|
| CN | 108146859 A | 6/2018 | |
| CN | 109791160 A | 5/2019 | |
| CN | 110342128 U | 10/2019 | |
| WO | WO-2016120224 A1 * | 8/2016 | .............. B01L 3/502 |
| WO | WO-2016170086 A1 * | 10/2016 | ........... A01N 1/0252 |

* cited by examiner

LIVING BODY SPECIMEN TRANSPORT DEVICE

BACKGROUND OF THE INVENTION

1. Field of the Invention

The present invention relates to a device for receiving living body specimens, especially to a device for receiving specimens and thereby transporting the living body specimens safely.

2. Description of the Prior Arts

Living body specimens only can live in a limited period, so the living body specimens have to be transport to a destination in the limited period so that the living body specimens can keep viability for subsequent using or procedure. To achieve this goal, the living body specimens should be transport under Good Tissue Practice, i.e. GTP. The GTP provides the following requirements: (1) avoiding cross contamination between transporter and the living body specimens; (2) tracking the locations of the living body specimens immediately during transportation; (3) recording information of environment of the living body specimens immediately during transportation; (4) ensuring the stability and safety of the living body specimens during the transportation.

Normally, living body specimens are sealed in test tubes or containers. Then, the living body specimens are stored with the test tubes or the containers in a device providing basic thermostat comprising multiple receiving slots than transported via a normal vehicle. As the living body specimens are mostly put into the test tubes or the containers with preservation solution, but if a conventional transport device receiving the containers may be vibrated and shaken during transporting of the living body specimens, the living body specimens are prone to adhere onto inner walls of the test tubes because some of the living body specimens have high viscosity. Therefore, the living body specimens may not be soaked in the preservative solution constantly, which causes the living body specimens to lose viability and thus the living body specimens may become useless. Moreover, the living body specimens may deteriorate after long term transport because the conditions of the transportation are unstable, which is another reason why some of the living body specimens are no longer useful for further procedure after transport. In other words, the conventional transportation method cannot provide an efficient, safe, and stable transportation conditions so does not comply with the requirements of GTP.

To overcome the shortcomings, the present invention provides a living body specimen transport device to mitigate or obviate the aforementioned problems.

SUMMARY OF THE INVENTION

The main objective of the present invention is to provide a living body specimen transport device that can receive multiple containers with living body specimens therein and keep the containers vertical. Furthermore, the living body specimen transport device can keep the living body specimens living and monitor and record the transporter, history, timing, location, and living body specimen, the living body specimen transport device may satisfy the requirements of GTP.

The living body specimen transport device has a frame and at least one tilting assembly. Each one of the at least one tilting assembly is pivotally mounted on the frame and comprises a rotating bracket and a storage assembly. The rotating bracket is pivotally mounted on the frame and is capable of rotating around a first axis with respect to the frame. The storage assembly is pivotally mounted on the rotating bracket and is capable of rotating around a second axis with respect to the rotating bracket. The first axis is unparallel to the second axis. The storage assembly comprises a receiving portion, a plurality of slots, and a lid portion. The receiving portion is pivotally mounted on the rotating bracket. The slots is located in the receiving portion. Each one of the slots is configured to receive a respective one of the living body specimens. The lid portion detachably is mounted on the receiving portion and is configured to cover the slots. A center of gravity of the storage assembly is lower than a pivoting point between the rotating bracket and the frame in location and is lower than a pivoting point between the storage assembly and the rotating bracket in location.

With aforesaid structure, if living body specimens are transported via the living body specimen transport device of the present invention, even though the living body specimen transport device is vibrated and shaken during transporting and then the frame of the living body specimen transport device is tilted or turned over, the rotating brackets and the storage assemblies can rotate to be vertical by themselves because of the gravity, which reduces the chance that the living body specimens leave the preservation solution to adheres onto the inner walls of the containers.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
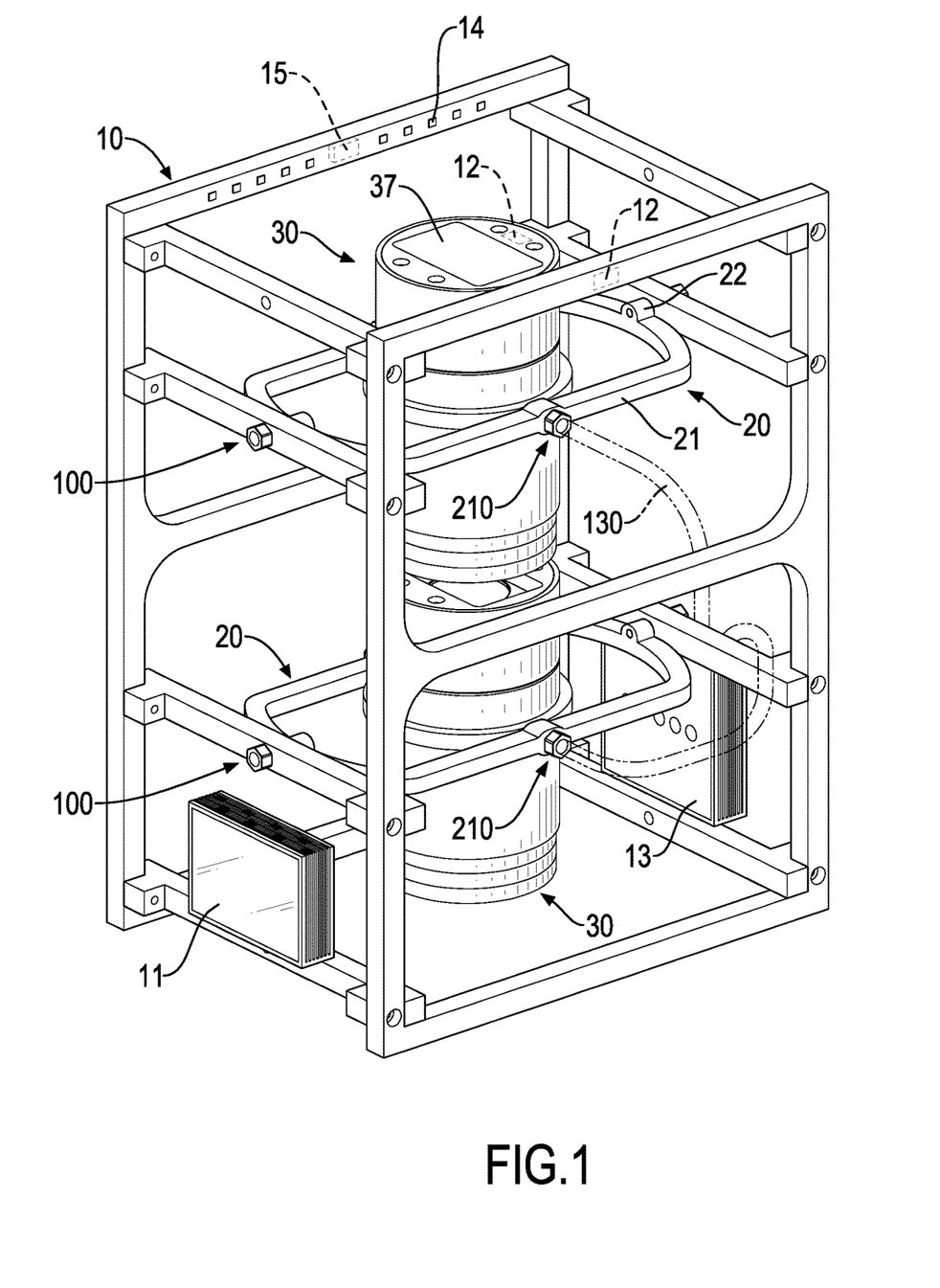
FIG. 1 is a perspective view of a living body specimen transport device in accordance with a first embodiment of the present invention.
Figure 2:
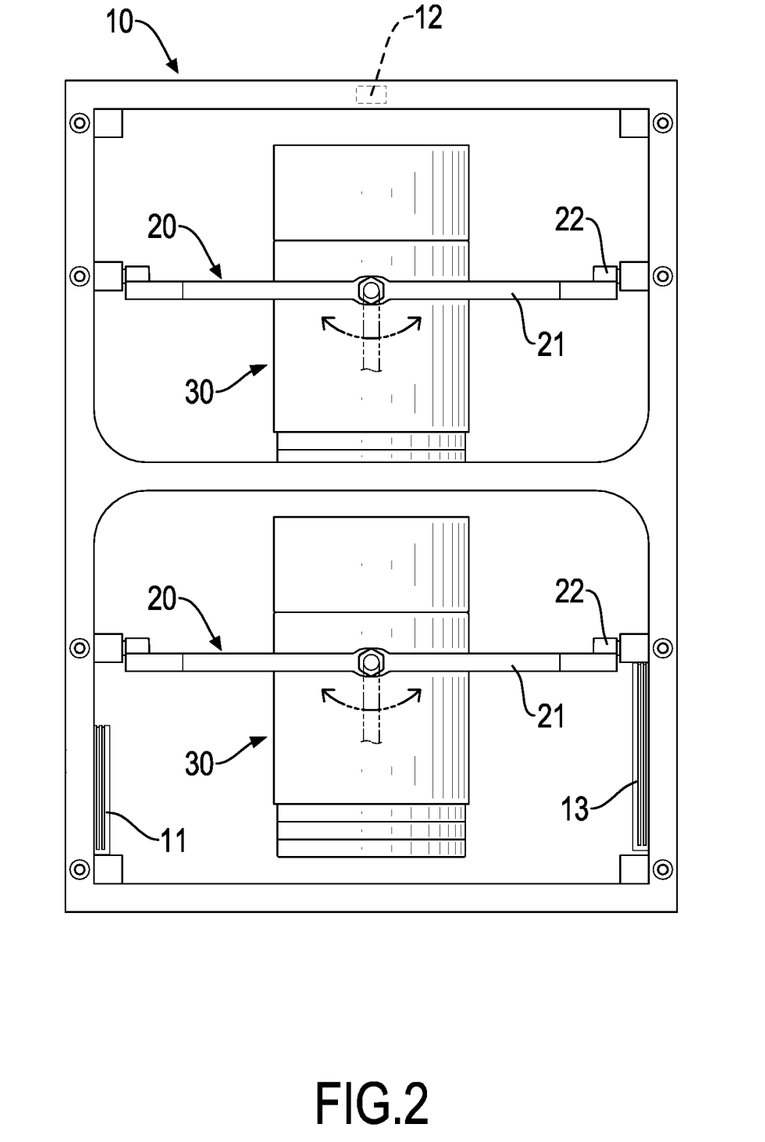
FIG. 2 is a side view of the living body specimen transport device in FIG. 1.
Figure 3:
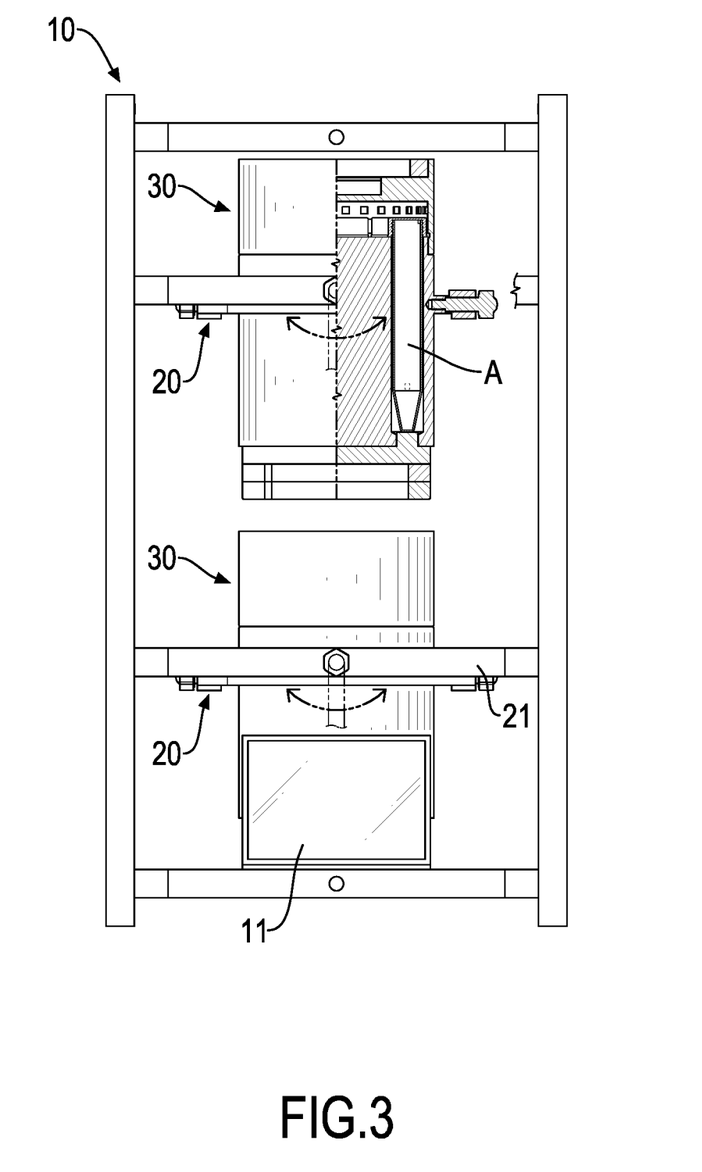
FIG. 3 is a partial sectional view of the living body specimen transport device in FIG. 1.

With reference to FIG. 1 to FIG. 3, a living body specimen transport device in accordance with the present invention is provided. The living body specimen transport device is configured to receive multiple containers A. In the first embodiment, the living body specimen transport device comprises a frame 10 and at least one tilting assembly. Each one of the at least one tilting assembly comprises a rotating bracket 20 and a storage assembly 30. The living body specimen transport device may selectively comprise a temperature control module 11, at least one RFID tag 12, and/or a power supply module 13. In this embodiment, the specimen transport device comprises two tilting assemblies, i.e. comprises two rotating brackets 20 and two storage assemblies 30, but the numbers are not limited thereto. Besides, at least one ultraviolet light source 14 and/or a global positioning system signal reception module 15 may be mounted on the frame 10.

Figure 5:
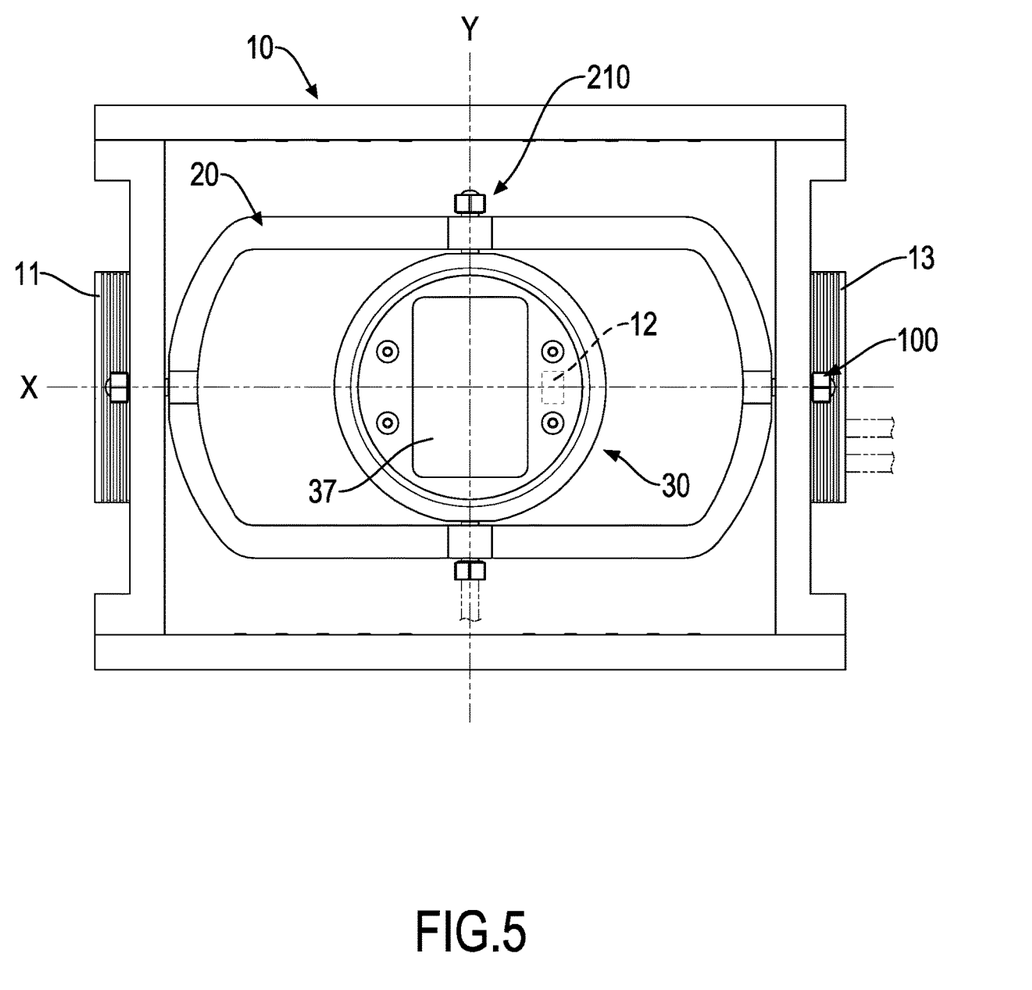
FIG. 5 is a top view of the living body specimen transport device in FIG. 1.

Pleas also refer to FIG. 5. The frame 10 has at least one first pivoting point 100. In this embodiment, the frame 10 may have four first pivoting points 100, but the number is not limited thereto. Each one of the rotating brackets 20 is mounted at two of the first pivoting points 100 of the frame 10 and each rotating bracket 20 is capable of pivoting about a first axis X with respect to the frame 10. In other words, the first pivoting point 100 is between the rotating bracket 20 and the frame 10. Precisely, each one of the rotating brackets 20 comprises an enclosing structure 21 and two protrusions 22. The enclosing structure 21 has two second pivoting points 210. The two protrusions 22 are mounted on the enclosing structure 21 and located on two opposite ends of the enclosing structure 21. Each one of the protrusions 22 protrudes upward from the enclosing structure 21 and is pivotally mounted at a respective one of the first pivoting points 100 of the frame 10. In other words, the enclosing structure 21 is lower than the first pivoting point 100 in location.

Each one of the storage assemblies 30 is mounted on a respective one of the rotating brackets 20 and is capable of pivoting about a second axis Y with respect to said rotating bracket 20. Precisely, each storage assembly 30 is pivotally mounted at two of the second pivoting points 210 of the enclosing structure 21 of said rotating bracket 20. In other words, the second pivoting point 210 is between the rotating bracket 20 and the storage assemblies 30. For the same rotating bracket 20, the second pivoting points 210 are lower than the first pivoting points 100 in location. The first axis X extends between two of the first pivoting points 100 and the second axis Y extends between two of the second pivoting points 210, and the first axis X and the second axis Y are not parallel to each other. In this embodiment, the first axis X and the second axis Y are perpendicular to each other. A center of gravity of the storage assembly 30 is lower than the first pivoting points 100 and the second pivoting points 210 of the corresponding rotating bracket 20 and thereby each storage assembly 30 can keep vertical when the frame 10 is tilted or turned over in any direction.

Figure 4:
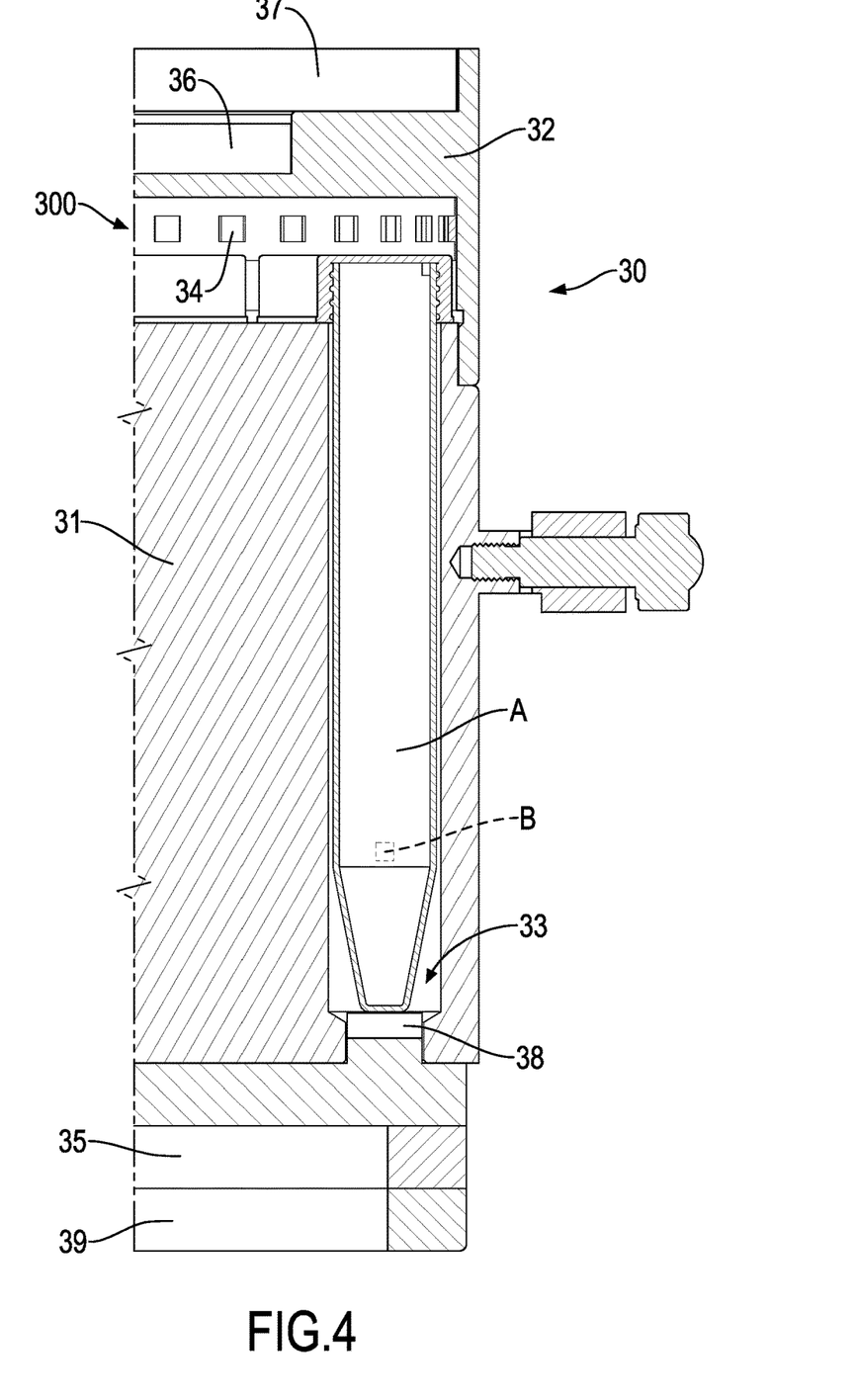
FIG. 4 is an enlarged sectional view of a storage assembly of the living body specimen transport device in FIG. 1.

Then please refer to FIG. 1, FIG. 4, and FIG. 5. Each of the storage assemblies 30 comprises a receiving portion 31, a lid portion 32, and a plurality of slots 33, and selectively comprises a communicating space 300, at least one ultraviolet light source 34 (hereinafter referred to as UV light source 34), a thermoelectric cooling chip 35, a global positioning system signal reception module 36 (hereinafter referred to as GPS signal reception module 36), a touch panel 37, a plurality of radio-frequency identification sensor modules 38 (hereinafter referred to as RFID sensor module 38), and/or a battery 39.

The receiving portion 31 is pivotally mounted on the enclosing structure 21 of the corresponding rotating bracket 20, and the lid portion 32 is detachably mounted on the receiving portion 31. The slots 33 are located in the receiving portion 31 and each one of the slots 33 is configured to receive one of the containers A. When the lid portion 32 is mounted on the receiving portion 31, the lid portion 32 can cover the slots 33 and thereby prevent the slots 33 from getting polluted. Besides, when the lid portion 32 is mounted on the receiving portion 31, the communicating space 300 is formed in the receiving portion 31 and the lid portion 32.

The communicating space 300 communicates with the slots 33. The at least one UV light source 34 may be multiple UV light sources 34 in this embodiment, but it is not limited thereto. The UV light sources 34 are securely mounted in the communicating space 300, and thus when the containers A are mounted in the slots 33, the UV light sources 34 will irradiate the containers A and thereby disinfects and sterilizes the containers A, which reduces the pollutant's influence on the living body specimens in the containers A.

The temperature control module 11 may be mounted on the frame 10, the thermoelectric cooling chip 35 may be mounted at a bottom of the receiving portion 31, and the temperature control module 11 is signally connected to the thermoelectric cooling chip 35. The temperature control module 11 is configured to control the efficacy of the thermoelectric cooling chip 35. Therefore, the thermoelectric cooling chip 35 is capable of cooling the receiving portion 31, the slots 33, and the containers A in the slots 33. In another embodiment, each thermoelectric cooling chip 35 may be operated independently from the temperature control module 11; in other words, some embodiments may not comprise the temperature control module 11

The GPS signal reception module 36 may be mounted in the lid portion 32 to receive GPS signals and thereby the location of the containers A is monitored.

The touch panel 37 may be mounted on an upper surface of the lid portion 32 and thereby the collector, the transporter, and the tester can input or read information of the containers A via the touch panel 37.

The RFID sensor modules 38 may be mounted in the slots 33 respectively and configured to identify the information of the containers via reading an RFID tag a on each one of the containers A.

Besides, the RFID tag 12 may be mounted on each one of the storage assemblies 30 and/or the frame 10 and thereby identifying the information of the living body specimen transport device and the storage assemblies 30.

The power supply module 13 may be securely mounted on the frame 10 comprise a battery (not shown in the drawings). The power supply module 13 is configured to be connected to an external power source for being charged. The battery 39 may be mounted at the bottom of the receiving portion 31. In this embodiment, the battery 39 may be located below the thermoelectric cooling chip 35. The battery 39 is configured to provide power with the UV light sources 34, the thermoelectric cooling chip 35, the GPS signal reception module 36, the touch panel 37, and the RFID sensor module 38. The power supply module 13 is electrically connected to the battery 39 so that the power supply module 13 can charge the battery 39 at any time, especially during transportation. In this embodiment, a cable 130 connects the power supply module 13 and the storage assemblies 30. Precisely, the cable 130 may be connect to the first pivoting point 100 or the second pivoting point 210.

Figure 6:
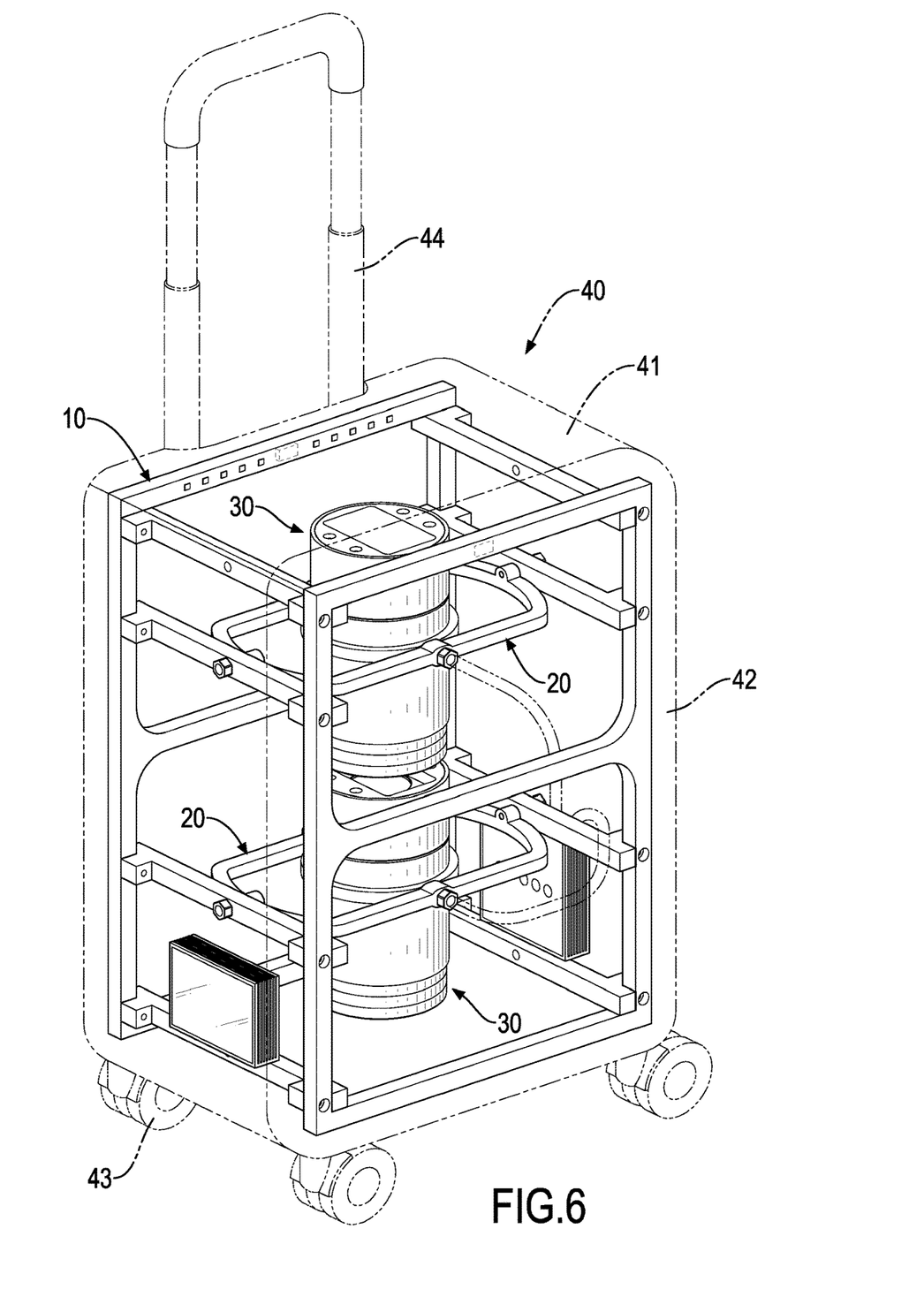
FIG. 6 is a perspective view of a living body specimen transport device in accordance with a second embodiment of the present invention.

Then please refer to FIG. 6. In a second embodiment, besides the frame 10, the rotating brackets 20, and the storage assemblies 30, the living body specimen transport device also comprises a case 40. The frame 10, the rotating brackets 20, and the storage assemblies 30 are mounted in the case 40. The case 40 comprises a housing portion 41, a cover portion 42, a plurality of wheels 43, and a pull rod 44, but it is not limited thereto. The housing portion 41 and the cover portion 42 form an inner space together and the frame 10, the rotating brackets 20, and the storage assemblies 30 are disposed in the inner space. In another embodiment, the housing portion 41 may comprise at least one partition to separate multiple storage assemblies 30; in said another embodiment, the number of the cover portions 42 may be equal to the number of the storage assemblies 30. In the second embodiment, the cover portion 42 is located at a lateral surface of the case 40. The wheels 43 and the pull rod 44 may be mounted on the housing portion 41. The pull rod 44 is capable of retracting into the housing portion 41.

Besides, the case 40 may comprise at least one UV light source, a GPS signal reception module, a touch panel, and a RFID tag so that the case 40 have a sterilization function, a positioning function, an operation function, and an identification function. For example, the UV light source may be mounted inside the case 40, and the GPS signal reception module, the touch panel, and the RFID tag may be mounted on the cover portion 42.

With aforesaid structure, when the living body specimens are transported via the living body specimen transport device of the present invention, even though the living body specimen transport device is vibrated and shaken during transporting and then the frame 10 of the living body specimen transport device is tilted or turned over, the rotating brackets 20 and the storage assemblies 30 can rotate to be vertical by themselves because of the gravity, which reduces chance that the living body specimens leave the preservation solution to adheres onto the inner walls of the containers A. In other words, the living body specimen transport device of the present invention can stably and safely transport and manage the living body specimens in a large amount and thereby every living body specimen may keep viability and can be processed efficiently.

On the other hand, with the UV light sources 34 disinfecting and sterilizing the container A and the thermoelectric cooling chip 35 keeping the container A at a low temperature, the rate of deterioration of the living body specimens may be decreased, so the living body specimens can be transported for a longer time and longer distance. With the RFID sensor module 38 identifying the container A and the RFID tag 12 allowing the living body specimen transport device to be identified, not only the transport is facilitated, but the frequency of opening the storage assemblies 30 is reduced, so the chance of touching the container A is lower and cross contamination between transporter and the living body specimens may be avoided.

With the wheels 43 and the pull rod 44 of the housing portion 40, the transporter may move the containers A with the entire living body specimen transport device with lower effort and better convenience. Besides, with the cover portion 42 located on the lateral surface of the case 40, the living body specimen transport device can be laid down and then the cover portion 42 is opened to retrieve the containers A.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A living body specimen transport device configured to receive a plurality of containers, each one of the containers configured to store a living body specimen; the living body specimen transport device comprising a frame and one or more tilting assemblies, and each one of the tilting assemblies pivotally mounted on the frame and comprising:

a rotating bracket pivotally mounted on the frame and capable of rotating around a first axis with respect to the frame; the rotating bracket comprising:
   an enclosing structure; and
   two protrusions mounted on the enclosing structure, located on two opposite ends of the enclosing structure, protruding upward from the enclosing structure, and pivotally mounted at the frame;
   a storage assembly pivotally mounted on the enclosing structure of the rotating bracket and capable of rotating around a second axis with respect to the rotating bracket;
   the first axis being unparallel to the second axis; the storage assembly comprising:
   a receiving portion pivotally mounted on the rotating bracket;
   a plurality of slots located in the receiving portion; each one of the slots configured to receive a respective one of the containers; and
   a lid portion detachably mounted on the receiving portion and configured to cover the slots;
   wherein a center of gravity of the storage assembly is lower than a pivoting point between the rotating bracket and the frame in location and is lower than a pivoting point between the storage assembly and the rotating bracket in location.

2. The living body specimen transport device as claimed in claim 1, wherein the storage assembly of each one of the tilting assemblies comprises:
   a communicating space formed between the receiving portion and the lid portion and communicating with the slots; and
   at least one ultraviolet (UV) light source securely mounted in the communicating space.

3. The living body specimen transport device as claimed in claim 1, wherein the storage assembly of each one of the tilting assemblies comprises:
   a thermoelectric cooling chip configured to keep the receiving portion and the slots at constant temperature.

4. The living body specimen transport device as claimed in claim 1, wherein the storage assembly of each one of the tilting assemblies comprises a global positioning system (GPS) signal reception module.

5. The living body specimen transport device as claimed in claim 1, wherein the storage assembly of each one of the tilting assemblies comprises a touch panel.

6. The living body specimen transport device as claimed in claim 1, wherein the storage assembly of each one of the tilting assemblies comprises:
   a plurality of radio-frequency identification (RFID) sensor modules mounted in the slots respectively to identify the containers in the slots.

7. The living body specimen transport device as claimed in claim 1 further comprising:
   at least one RFID tag mounted on the storage assembly.

8. The living body specimen transport device as claimed in claim 1 further comprising:
   an RFID tag mounted on the frame.

9. The living body specimen transport device as claimed in claim 2, wherein the storage assembly of each one of the tilting assemblies comprises a battery.

10. The living body specimen transport device as claimed in claim 9 further comprising:
    a power supply module securely mounted on the frame and connected to the battery.

11. The living body specimen transport device as claimed in claim 1 further comprising:

a case; the frame, the rotating bracket, and the storage assembly mounted in the case; the case comprising:
a plurality of wheels; and
a pull rod.

* * * * *